US008963831B2

(12) United States Patent
Coulon

(10) Patent No.: US 8,963,831 B2
(45) Date of Patent: Feb. 24, 2015

(54) METHOD AND DEVICE FOR CONTROLLING AN APPARATUS AS A FUNCTION OF DETECTING PERSONS IN THE VICINITY OF THE APPARATUS

(75) Inventor: David Coulon, Aix en Provence (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 203 days.

(21) Appl. No.: 13/552,426

(22) Filed: Jul. 18, 2012

(65) Prior Publication Data
US 2013/0021240 A1 Jan. 24, 2013

(30) Foreign Application Priority Data

Jul. 18, 2011 (FR) ..................................... 11 56495

(51) Int. Cl.
G09G 5/00 (2006.01)
G06F 21/84 (2013.01)
G06F 21/62 (2013.01)
G06K 9/00 (2006.01)

(52) U.S. Cl.
CPC ............ *G06F 21/84* (2013.01); *G06F 21/6245* (2013.01); *G06K 9/00228* (2013.01)
USPC ............ 345/156; 345/158; 348/152; 382/103

(58) Field of Classification Search
CPC ......... G06F 3/012; G06F 3/017; G06F 3/018; G06F 3/01; G06F 11/3231
USPC ..................... 345/156–158; 348/152; 382/103
See application file for complete search history.

(56) References Cited

U.S. PATENT DOCUMENTS

| 6,348,928 | B1* | 2/2002 | Jeong ............................. 345/649 |
| 8,613,008 | B2* | 12/2013 | Daniel ............................ 725/12 |
| 2006/0139326 | A1* | 6/2006 | Tsukamoto ..................... 345/158 |
| 2007/0150827 | A1 | 6/2007 | Singh et al. |
| 2008/0046930 | A1* | 2/2008 | Smith et al. ..................... 725/46 |
| 2010/0124363 | A1 | 5/2010 | Ek et al. |
| 2011/0135114 | A1* | 6/2011 | Oba et al. ...................... 381/107 |

FOREIGN PATENT DOCUMENTS

| WO | 2006/023384 A2 | 3/2006 |
| WO | 2007/118122 A2 | 10/2007 |

OTHER PUBLICATIONS

Rahman et al, "Person to Camera Distance Measurement Based on Eye-Distance", 2009 Third International Conference on Multimedia and Ubiquitous Engineering, IEEE Computer Society. pp. 137-141, 2009.

(Continued)

*Primary Examiner* — Jennifer Nguyen
(74) *Attorney, Agent, or Firm* — Seed IP Law Group PLLC

(57) ABSTRACT

A method for controlling an electronic apparatus, includes steps of: acquiring an image of the environment of the apparatus, detecting the presence of human faces in the image acquired, estimating a respective position of each face detected in relation to the apparatus, and sending a signal to the apparatus to enable a function of the apparatus if a condition is met relating to a number of faces detected in the image and/or the estimated position of each detected face.

28 Claims, 5 Drawing Sheets

(56) References Cited

OTHER PUBLICATIONS

Singh et al, "A Robust Skin Color Based Face Detection Algorithm", Tamkang Journal of Science and Engineering, vol. 6, No. 4, pp. 227-234, 2003.

Yang et al, "Detecting Faces in Images: A Survey", IEEE Transactions on Pattern Analysis and Machine Intelligence, vol. 24, No. 1, pp. 34-58, Jan. 2002.

* cited by examiner

METHOD AND DEVICE FOR CONTROLLING AN APPARATUS AS A FUNCTION OF DETECTING PERSONS IN THE VICINITY OF THE APPARATUS

BACKGROUND

1. Technical Field

The present disclosure relates to detecting the presence of persons in a field of view. The present disclosure applies, for example, to the protection of confidential information presented on a display screen of a fixed or mobile electronic apparatus, such as a personal computer, a mobile telephone or a PDA (Personal Digital Assistant).

2. Description of the Related Art

The use of such an apparatus particularly in a public place may expose confidential information displayed on the screen to non-authorized persons. To try to solve this problem, so-called privacy filters in the form of a film arranged on the screen to reduce the width of the field of view of the screen, centered on a perpendicular axis and centered on the screen have already been proposed. Such a filter, which is for example described in the document WO 2007/118122, enables people in the vicinity of this axis to view the information displayed, this information not being generally visible to persons located outside this axis. Such a filter does not therefore prevent a person located behind the user in the vicinity of this axis from viewing the information displayed. In addition, such a filter affects the colors and the brightness of the images displayed by the screen. To offset this negative effect, the brightness of the screen can be forced, but this increases the current consumption of the screen, which is not desirable in the case of battery-powered apparatuses.

Document WO 2006/023384 in particular, also proposes an electronic filter which can be enabled or disabled according to the needs of the user. When enabled, this filter behaves substantially in the same way as the passive film arranged on the screen described above. However, this solution may use resources of the apparatus to change the images displayed so as to limit the field of view of these images. This solution also requires the user to manually enable or disable the electronic filter. The user may therefore forget to enable the filter when controlling the display of confidential information on the screen of the apparatus, or may not notice that a person has approached the screen and may have access to the information displayed. Some users thus prefer to leave the filter on at all times to avoid forgetting to enable it. In this case, this filter thus has substantially the same disadvantages as the passive filter described above in terms of the brightness and overconsumption of the screen.

The use of such an electronic filter also has the disadvantage of making the apparatus more complex to use. This disadvantage can be mitigated by providing an additional command button on the apparatus. However, adding such a button may involve integration problems, particularly when the apparatus is small, as is the case of mobile telephones, and induces an extra manufacturing cost.

Furthermore, such filters, whether passive or electronically enableable, do not protect confidential data introduced by means of a keyboard of the apparatus. Indeed, an ill-intentioned person may observe the movements of the user's fingers for example while the latter enters a confidential code, and thus have access to such a code without the user knowing.

BRIEF SUMMARY

It is desirable to protect the confidentiality of information displayed on the display screen of an electronic apparatus or introduced when such a device is used. It is also desirable to provide this protection without significantly increasing the power consumption of the apparatus implementing this protection.

Some embodiments relate to a method for controlling an electronic apparatus, comprising steps of: acquiring an image of the environment of the apparatus, and detecting the presence of human faces in the image acquired.

According to one embodiment, the method comprises steps of: estimating a respective position of each face detected in relation to the apparatus, and sending a signal to the apparatus to enable a function of the apparatus, if a condition is met relating to a number of faces detected in the image and/or the estimated position of each detected face.

According to one embodiment, the estimation of the position of each face detected in an image comprises a step of estimating an angle formed between a camera axis direction of the image acquired and a direction in which the detected face is located.

According to one embodiment, the estimation of the position of each detected face comprises the estimation of a distance between the apparatus and the detected face.

According to one embodiment, the distance between the apparatus and a face detected in the image is estimated by triangulation using two images obtained from exposure stations spaced out from one another, or by applying the following formula:

$$D = k \frac{oh}{ps \cdot mos}$$

in which: D is the distance to be estimated, oh is an actual distance chosen in a human face, mos is the value of the distance chosen in the detected face, measured in the image in number of pixels, ps is the width of a pixel, and k is a constant related to characteristics of the image sensor.

According to one embodiment, the method comprises steps of determining whether or not each face detected in a field of view of the apparatus, is that of a user of the apparatus or of a person authorized by the user, or that of a potential intruder, based on the estimated distance between the apparatus and the detected face.

According to one embodiment, the enabled function of the apparatus comprises at least one of the following operations: going into a standby mode of the apparatus if no face is detected at a distance below a distance threshold, and at an angle in relation to a camera axis direction of the image acquired, below an angle threshold, leaving the standby mode if a face is again detected at a distance below the distance threshold, and at an angle in relation to the camera axis direction below the angle threshold, and enabling a privacy protection function if at least two faces are detected at an angle in relation to the camera axis direction below the angle threshold, and at distances from the apparatus respectively below and above the distance threshold or spaced out by a distance difference threshold value.

According to one embodiment, the protection function comprises at least one of the following operations: sending or displaying an alert signal, displaying the face of a person detected as an intruder, and enabling a privacy filter on a display screen of the apparatus.

According to one embodiment, the method comprises steps of determining the average brightness of the image acquired and of turning on a lighting device if the average brightness determined is insufficient.

Some embodiments also relate to a device for controlling an electronic apparatus, comprising an image sensor, and a processing unit connected to the image sensor and configured to implement the method defined above.

According to one embodiment, the image sensor is configured to supply color or monochromatic images.

According to one embodiment, the image sensor is associated with an objective having a shooting field ranging between 80° and 120°.

According to one embodiment, the device comprises an interface circuit to link the processing unit to a lighting device, the processing unit being configured to control the lighting device according to an average brightness of the images sent by the image sensor.

According to one embodiment, the device is integrated into a system on chip comprising a microcontroller and a light-sensitive cell matrix.

In an embodiment, a method, comprising: acquiring, using a protection device, an image of an environment of an electronic apparatus; detecting, using the protection device, the presence of one or more human faces in the image acquired; estimating, using the protection device, a respective position of each face detected in relation to the apparatus; and sending a signal to the apparatus to enable a function of the apparatus based on a number of faces detected in the image and the estimated position of each detected face. In an embodiment, the estimation of the position of each face detected in an image comprises estimating an angle formed between a camera axis direction of the image acquired and a direction in which the detected face is located. In an embodiment, the estimation of the position of each detected face comprises estimating a distance between the apparatus and the detected face. In an embodiment, the estimating the distance between the apparatus and a face detected in the image comprises at least one of triangulation using two images obtained from exposure stations of the protection device spaced out from one another, and applying the following formula:

$$D = k \frac{oh}{ps \cdot mos}$$

in which:

D is the distance to be estimated, oh is a threshold distance chosen in a human face, mos is the value of the distance chosen in the detected face, measured in the image in number of pixels, ps is the width of a pixel, and k is a constant related to characteristics of the protection device. In an embodiment, the method comprises determining whether each face detected in a field of view of the apparatus is that of a user of the apparatus or of a person authorized by the user, or that of a potential intruder, based on the estimated distance between the apparatus and the detected face. In an embodiment, the enabled function of the apparatus comprises at least one of the following operations: going into a standby mode of the apparatus if no face is detected at a distance below a distance threshold, and at an angle in relation to a camera axis direction of the image acquired, below an angle threshold, leaving the standby mode if a face is detected at a distance below the distance threshold, and at an angle in relation to the camera axis direction below the angle threshold, and enabling a privacy protection function if at least two faces are detected at an angle in relation to the camera axis direction below the angle threshold, and at distances from the apparatus respectively below and above the distance threshold or spaced out by a distance difference threshold value. In an embodiment, the protection function comprises at least one of the following operations: sending or displaying an alert signal; displaying the face of a person detected as an intruder; and enabling a privacy filter on a display screen of the apparatus. In an embodiment, the method comprises determining an average brightness of the image acquired and of turning on a lighting device if the average brightness determined is below a threshold. In an embodiment, the protection device comprises an image sensor coupled to a dedicated processing unit. In an embodiment, the protection device comprises a monochromatic image sensor.

In an embodiment, a device comprises: an image sensor configured to acquire an image of an environment of an electronic apparatus; and image processing circuitry configured to: detect the presence of one or more human faces in the image acquired; estimate a respective position of each face detected in relation to the apparatus; and selectively initiate a function of the apparatus based on a number of faces detected in the image and the estimated position of each detected face. In an embodiment, the image processing circuitry is configured to estimate an angle formed between a axis direction of the image acquired and a direction in which a detected face is located. In an embodiment, the image processing circuitry is configured to estimate a distance between the apparatus and a detected face. In an embodiment, the image processing circuitry is configured to estimate the distance between the apparatus and the face detected in the image by applying $$D = k \frac{oh}{ps \cdot mos}$$

in which: D is the distance to be estimated, oh is a threshold distance chosen in a human face, mos is the value of the distance chosen in the detected face, measured in the image in number of pixels, ps is the width of a pixel, and k is a constant related to characteristics of the protection device. In an embodiment, the device comprises a second image sensor, wherein the image processing circuitry is configured to estimate the distance between the apparatus and the face using triangulation applied to images taken by the two image sensors of the device. In an embodiment, the image processing circuitry is configured to determine whether each face detected in a field of view of the apparatus is that of a user of the apparatus or of a person authorized by the user, or that of a potential intruder, based on the estimated distance between the apparatus and the detected face. In an embodiment, the function of the apparatus comprises at least one of the following operations: going into a standby mode of the apparatus if no face is detected at a distance below a distance threshold, and at an angle in relation to a camera axis direction of the image acquired, below an angle threshold, leaving the standby mode if a face is detected at a distance below the distance threshold, and at an angle in relation to the camera axis direction below the angle threshold, and enabling a privacy protection function if at least two faces are detected at an angle in relation to the camera axis direction below the angle threshold, and at distances from the apparatus respectively below and above the distance threshold or spaced out by a distance difference threshold value. In an embodiment, the protection function comprises at least one of the following operations: sending or displaying an alert signal; displaying the face of a person detected as an intruder; and enabling a privacy filter on a display screen of the apparatus. In an embodiment, the device is a system on a chip comprising the image sensor and the image processing circuitry. In an embodiment, the image sensor comprises a monochromatic image sensor. In an embodiment, the image sensor is associated with an objective having a shooting field ranging between 80° and 120°. In an embodiment, the device comprises an interface circuit to link processing circuitry to a lighting device, the processing circuitry being configured to control the lighting device according to an average brightness of the images sent by the image sensor.

In an embodiment, a system comprises: a display; processing circuitry coupled to the display; and a protection device having: an image sensor configured to acquire an image of an environment of the display; and one or more processors configured to: detect the presence of one or more human faces in the image acquired; estimate a respective position of each face detected in relation to the display; and selectively send a signal to the processing circuitry based on a number of faces detected in the image and the estimated position of each detected face. In an embodiment, the protection device is configured to estimate an angle formed between a axis direction of the image acquired and a direction in which a detected face is located and a distance between the display and the detected face. In an embodiment, the protection device is configured to determine whether each face detected in a field of view of the display is that of a user of the system or of a person authorized by the user, or that of a potential intruder, based on the estimated distance between the apparatus and the detected face. In an embodiment, the system comprises a lighting device, wherein the protection device is configured to determine an average brightness of the image acquired and turn on the lighting device if the average brightness determined is below a threshold. In an embodiment, the image sensor comprises a monochromatic image sensor.

BRIEF DESCRIPTION OF THE SEVERAL VIEWS OF THE DRAWINGS

Some examples of embodiments of the present disclosure will be described below in relation with, but not limited to, the following figures, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations, such as, for example, displays, image sensors, processor cores, etc., are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
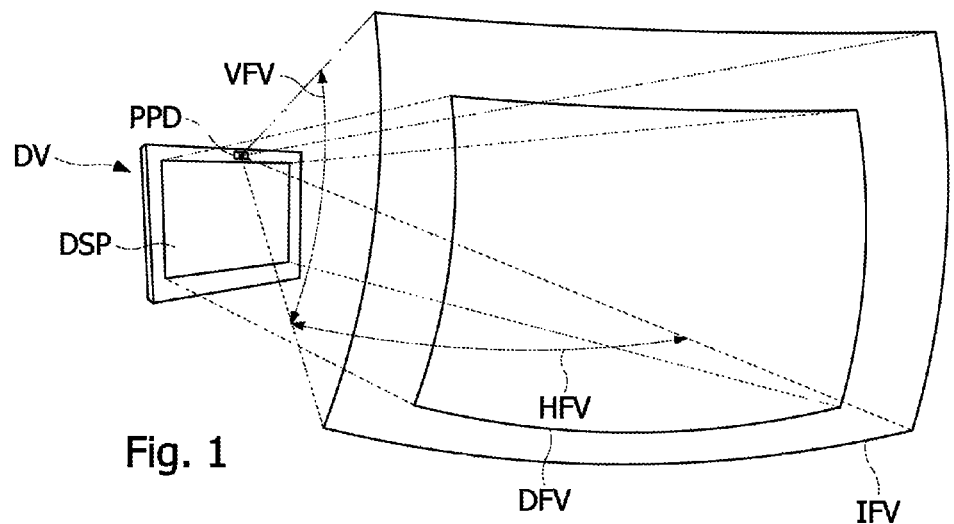
FIG. 1 schematically represents an electronic apparatus equipped with a privacy protection device, according to one embodiment.

FIG. 1 represents an electronic apparatus DV comprising a display screen DSP. According to one embodiment, the apparatus DV is equipped with a protection device PPD comprising an image sensor associated with an objective. The assembly made up of the image sensor and the objective has a field of view FV with a horizontal width HFW and a vertical width VFW, related to the focal length of the objective and to the dimensions of the light-sensitive surface of the image sensor. The field FV may include a display field of view DFV, which a person generally must be in to view an image displayed on the screen DSP of the apparatus DV.

The apparatus DV can be any apparatus displaying images from a video stream. If the apparatus comprises or is coupled to a keyboard or command keys enabling a user to introduce confidential data, the field FV may also include a field from which a person can see the keyboard or the keys.

According to one embodiment, the device PPD is configured to detect human faces in the images supplied by the image sensor, and to locate the detected faces so as to determine whether or not each detected face is situated in a zone from which images displayed on the screen DSP can be observed intelligibly. There are several algorithms enabling human faces to be detected in an image. Thus, the document "Detecting Faces in Images: A Survey", Ming-Hsuan Yang, J. Kriegman, Narendra Ahuja, IEEE Transactions on Pattern Analysis and Machine Intelligence, Vol. 24, No. 1, January 2002, describes several algorithms for detecting human faces which can be implemented by the device PPD. There are also algorithms for detecting human faces in images based on the color of the skin, which can be implemented if the image sensor used supplies chrominance information (see for example the document "A Robust Skin Color Based Face Detection Algorithm", Sanjay Kr. Singh, D. S. Chauhan, Mayank Vatsa, Richa Singh, Tamkang Journal of Science and Engineering, Vol. 6, No. 4, pp. 227-234, 2003).

Figure 2A:
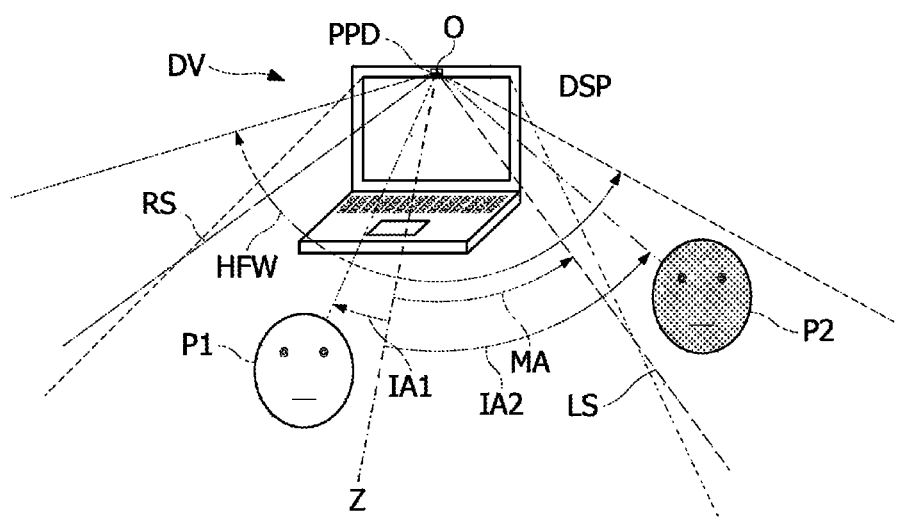
FIGS. 2A, 2B represent an electronic apparatus and an image taken by a protection device, in a situation of use of the apparatus, taken into account by the protection device, according to one embodiment.
Figure 2B:
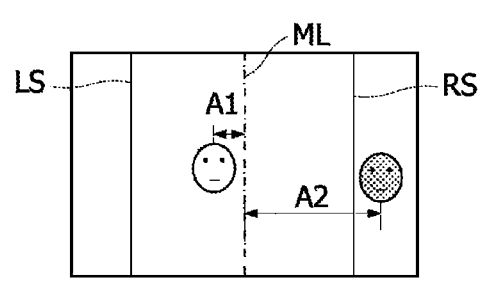

FIGS. 2A, 2B represent the electronic apparatus DV and an image taken by the protection device PPD, in a situation of use taken into account by the protection device. In FIGS. 2A, 2B, two persons P1, P2 are in front of the screen DSP. The person P1 is in a zone from which an image displayed on the screen DSP can be intelligibly observed. This zone is delimited by vertical planes LS, RS forming an angle MA with an axis OZ corresponding to the camera axis direction of the image sensor of the device PPD. The axis OZ can be situated in a vertical plane passing through a median line of the screen DSP. The angle MA corresponds to a threshold intelligible viewing angle of the images displayed on the screen DSP. The person P2 is outside the zone delimited by the planes LS, RS and thus generally cannot intelligibly see the image displayed on the screen DSP.

The device PPD determines whether or not each detected face is in the zone delimited by the planes LS, RS. For this purpose, the device PPD determines, in each image in which faces have been detected, a distance A1, A2 between each face and a vertical median line ML of the image corresponding to the direction OZ. Each of the distances A1, A2 corresponds to an angle IA1, IA2 in relation to the axis OZ. The distance obtained is then compared with a distance threshold value corresponding to the angle MA, and equal to the distance between the line ML and lines corresponding to the planes LS, RS.

Figure 3A:
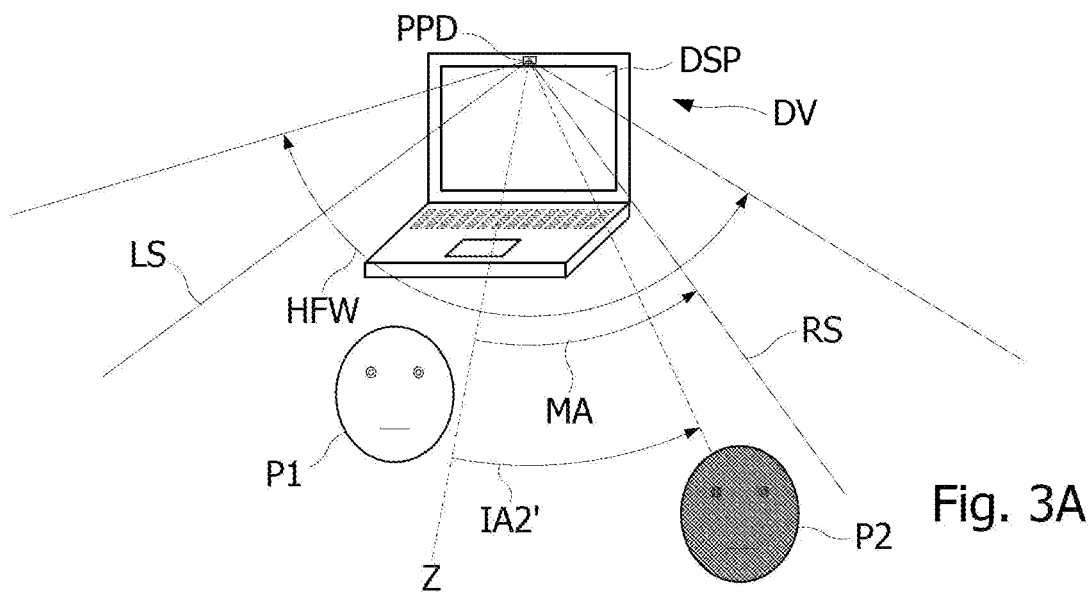
FIGS. 3A, 3B 3C represent an electronic apparatus and an image taken by a protection device, in a situation of use of the apparatus, taken into account by the protection device, according to one embodiment.
Figure 3B:
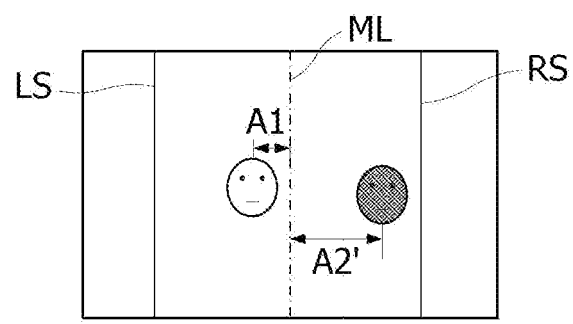

FIGS. 3A, 3B represent the apparatus DV and an image taken by the protection device PPD, in a situation of use taken into account by the protection device. In FIGS. 3A, 3B, the two persons P1, P2 are in front of the screen DSP, in the zone delimited by the planes LS, RS, but at different distances from the screen DSP. The face of the person P2 is detected at a distance A2' from the median line ML of an image supplied by the image sensor of the device PPD. The distance A2' corresponds to an angle IA2' with the axis OZ, smaller than the angle MA.

Figure 3C:
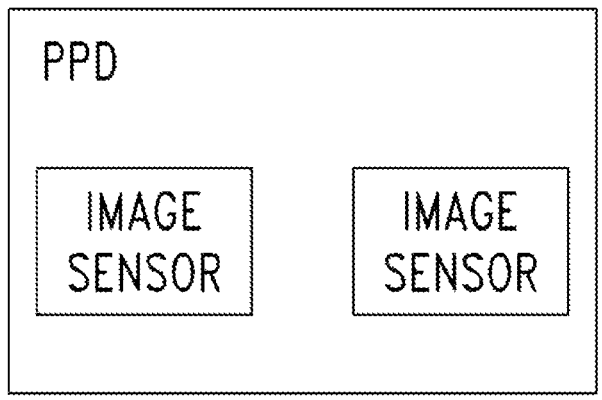

According to one embodiment, the device PPD is also configured to determine a distance between each detected face and the screen DSP or the image sensor of the device PPD. For this purpose, the device PPD may comprise two image sensors to obtain two images taken at different angles (see Figure. 3C) and use these two images to determine the distances sought by triangulation. The distance calculation method by triangulation can also be used if the device PPD comprises a single image sensor and an optical device forming two images juxtaposed on the image sensor. The distance between each detected face and the image sensor can also be estimated based on the distance between the two eyes of the face appearing in an image. For this purpose, the device PPD may implement for example the algorithm described in the document "Person to Camera Distance Measurement Based on Eye-Distance", Khandaker Abir Rahman et al., 2009 Third International Conference on Multimedia and Ubiquitous Engineering, IEEE Computer Society.

According to one embodiment, the device PPD estimates the distance D between the image sensor and each detected face by applying the following formula:

$$D = k \frac{oh}{ps \cdot mos} \quad (1)$$

in which:

oh is an actual distance chosen in a human face (height, width of the face, or distance between the eyes, etc.)

mos is the value of the distance chosen in the face, measured in the image in number of pixels, ps is the width of a pixel, and k is a constant related to the features of the objective lenses and of the light-sensitive cell matrix of the image sensor.

The distance oh can be chosen equal to an average value obtained from measures taken on a significant number of adult faces. If the distance oh is chosen equal to the height of a face, it can be set, for example, to a value between 10 and 15 cm. The value mos depends on the actual distance between the face and the image sensor and on features of the image sensor such as the width of a pixel and the dimensions in number of pixels of the light-sensitive cell matrix of the image sensor.

The device PPD can be configured to determine whether each face detected in the field between the planes LS, RS, is that of the user of the apparatus DV or of a person authorized by the user, or that of a potential intruder, based on the distance between each detected face and the image sensor of the device PPD.

Figure 4:
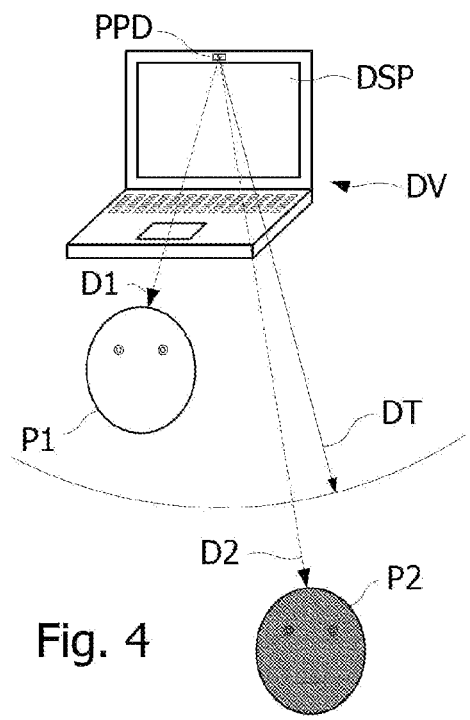
FIGS. 4 and 5 represent an electronic apparatus in other situations of use taken into account by a protection device, according to one embodiment, FIG. 6 schematically represents circuits of a protection device, according to one embodiment.
Figure 5:
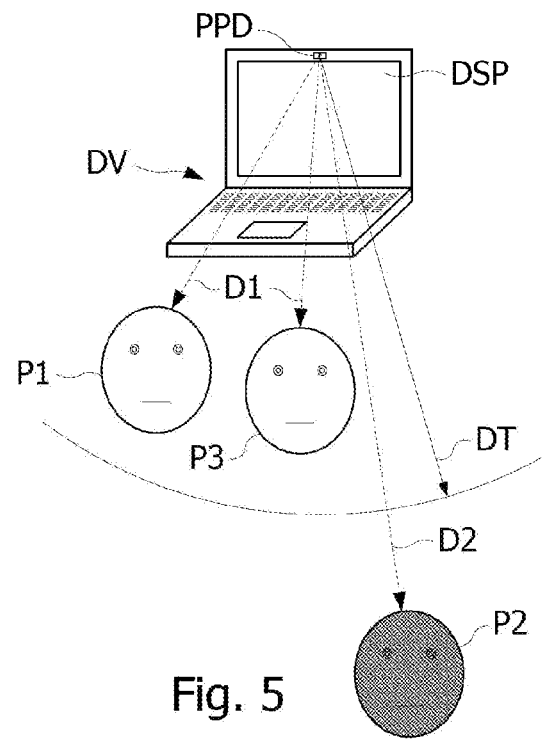

FIGS. 4 and 5 represent the apparatus DV and human faces detected by the device PPD in the vicinity of the apparatus. In FIG. 4, two faces are detected in front of the screen DSP in the zone delimited by the planes LS, RS, i.e., the face of the person P1 located at a distance D1 from the image sensor, and the face of the person P2 located at a distance D2. The device PPD is configured to apply a distance threshold value DT to the estimated distances D1, D2 of the detected faces. Thus, if the estimated distance D1, D2 of a detected face is below the threshold value DT, the corresponding face is considered to be that of a user of the apparatus DV. If the estimated distance D1, D2 of a detected face is above the threshold value DT, the corresponding face may be that of an intruder trying to observe the screen DSP without the apparatus user knowing. In the example in FIGS. 4 and 5, the person P1 at the distance D1 from the image sensor is considered to be a user of the apparatus DV, and the person P2 at the distance D2 is considered to be a potential intruder.

In FIG. 5, the face of a third person P3 is detected at a distance substantially equal to the distance D1 from the face of the person P1. It is then considered that the person P3 is inevitably seen by the person P1 and thus observes the screen DSP with the authorization of the user of the apparatus DV.

According to another embodiment, the faces of potential intruders can also be determined based on a difference in the distance between the estimated distance of the closest face to the screen DSP or to the image sensor and that of the other faces possibly detected. If this difference is below a difference threshold value for a detected face, the face is considered to be that of a person inevitably seen and thus authorized by the user. If this difference in distance is above the difference threshold value for a detected face, it is considered that the face furthest from the screen DSP is that of a potential intruder.

In an embodiment, if a potential intruder is detected, the device PPD is configured to alert the user, for example by emitting a sound alarm, or by displaying a message on the screen. The message on the screen can be associated with a portion of image extracted from the image coming from the image sensor containing the face of the potential intruder detected. The user can then take any appropriate measure, particularly according to the confidential nature of the information displayed on the screen DSP. If the apparatus DV comprises an electronic privacy filter placed in front of the screen, the user can enable this filter. The device PPD can also be configured to automatically control the enabling of this filter in the event that a potential intruder is detected. The device PPD can also be configured to merely send the apparatus DV a potential intruder detection signal, this signal then being used by the apparatus to inform the user of the intrusion in one of the ways described above, to enable an electronic privacy filter, etc.

The device PPD can also be configured to control the standby or enabling of the apparatus DV according to the absence or presence of a face detected in front of the screen DSP in the detection zone delimited by the planes LS, RS and the distance threshold DT. The device PPD can simply be configured to send the apparatus DV a signal indicating the presence of a person in the detection zone, so as to enable the apparatus DV to control the standby or switch-off of the screen DSP if the user of the apparatus is absent, and the enabling or switch-on of the screen when a person is again detected in front of the screen DSP. The apparatus may also merely enable or disable a screen saver according to this detection signal.

In the event that the apparatus DV is a computer such as a laptop or a mobile telephone, for example a smartphone, the device PPD can be produced in the form of a program executed by the main processor of the computer or telephone, and using a video camera (webcam) that is mounted above the display screen of the apparatus or positioned next to it. The video camera may then supply the device PPD with color images.

According to one embodiment, the device PPD is produced in the form of autonomous circuits associating an image sensor with a processor programmed to perform image processing functions so as to detect faces and estimate the position of each detected face.

Figure 6:
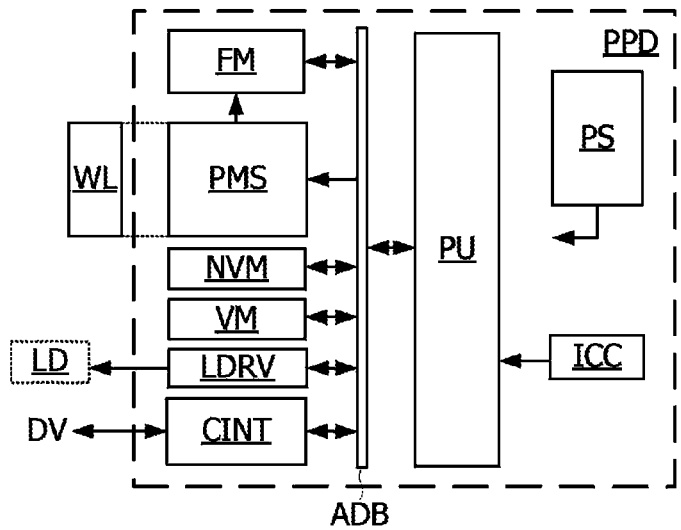

FIG. 6 represents the device PPD according to one embodiment. The device PPD comprises:
- a processing unit PU connected to an address and data bus ADB,
- a light-sensitive cell matrix PMS connected to the bus ADB and to a frame memory FM which is connected to the bus ADB,
- volatile and non-volatile memories VM and NVM also connected to the bus ADB, the non-volatile memory enabling programs executed by the unit PU and data necessary for its operation to be stored,
- a communication interface circuit CINT connected to the bus ADB and enabling the unit PU to communicate particularly with the apparatus DV,
- a clock circuit ICC supplying the clock signals used by the operation for example of the processing unit PU and the matrix PMS, and
- a power supply circuit PS supplying the circuits of the device PPD with power.

The matrix PMS is associated with an optical objective WL, for example by means of a box into which the device PPD is mounted. The interface circuit CINT enables the user to configure the device PPD from the apparatus DV and enables the unit PU to send the apparatus, in particular, an alert signal further to the detection of a potential intruder. The circuit CINT does not need to provide a high transmission rate, due to the fact that it will not transmit any images, except possibly small images if it is planned to display on the screen DSP the images of the potential intruder faces detected. Therefore, the circuit CINT may comprise an interface circuit, for example of an SPI and/or I2C type, that offers the advantage of having a lower power consumption than a USB-type interface. Furthermore, as the device PPD may operate without transmitting any image to the apparatus, the risk of a spy program installed in the apparatus (of personal computer type) transmitting for example images taken by the image sensor via the Internet may be avoided.

In the example in FIG. 6, the image sensor (PMS, WL) is specific to the protection device PPD. It can thus be chosen so as to be specifically adapted to the face detection function. Therefore, the objective can have a wide field of view, to have an extended detection zone, such an objective not being adapted to taking quality photographs. The matrix PMS can be monochromic, particularly to obtain a better sensitivity than a cell matrix equipped with color filters provided to produce color images. The matrix PMS may not be equipped with an infrared filter and thus be sensitive to near-infrared rays so as to supply images of a low-lit scene. Using a monochromic image sensor also simplifies the detection of faces by avoiding the need to process chrominance data.

The fact that the device PPD of an embodiment comprises its own processing unit PU to process the images coming from the image sensor avoids consuming the computing power resources of the monitored apparatus DV to perform a face detection in images. Indeed, such a detection process may busy up to 20% of the computing power of a personal computer. In addition, it is not necessary to send images to the external environment of the device PPD and thus to provide a communication interface adapted to the transmission of a relatively large quantity of data. The device PPD can therefore ensure a monitoring function, even if the monitored apparatus DV is in a standby mode. The device PPD can therefore switch the apparatus DV on and off according to the presence of a user in the vicinity of the apparatus. Furthermore, the processing unit PU can directly access the frame memory FM in which the images coming from the matrix PMS are formed, without going through an interface to communicate with an external circuit. The result is that the image processing can be much swifter than if the images had to be sent by a USB-type interface circuit for example.

The device PPD may also comprise a control circuit LDRV for controlling a lighting device LD, with light emitting diodes for example, used, if necessary, to light up the scene observed by the image sensor made up of the matrix PMS and the objective WL. The circuit LDRV is also connected to the bus ADB. The unit PU can thus be configured to determine the average brightness of each image acquired by the matrix PMS and to control the switch-on of the lighting device LD if the average brightness is insufficient to perform a face detection.

According to one embodiment, the objective WL has a wide angle with a field ranging between 80° and 120°, for example equal to 90°, to monitor the entire zone from which the screen DSP can typically be intelligibly observed.

According to one embodiment, the device PPD is produced in the form of a system on chip (SoC) into which the circuits of the device PPD described above and particularly a microcontroller, and the light-sensitive cell matrix PMS are integrated.

Figure 7:
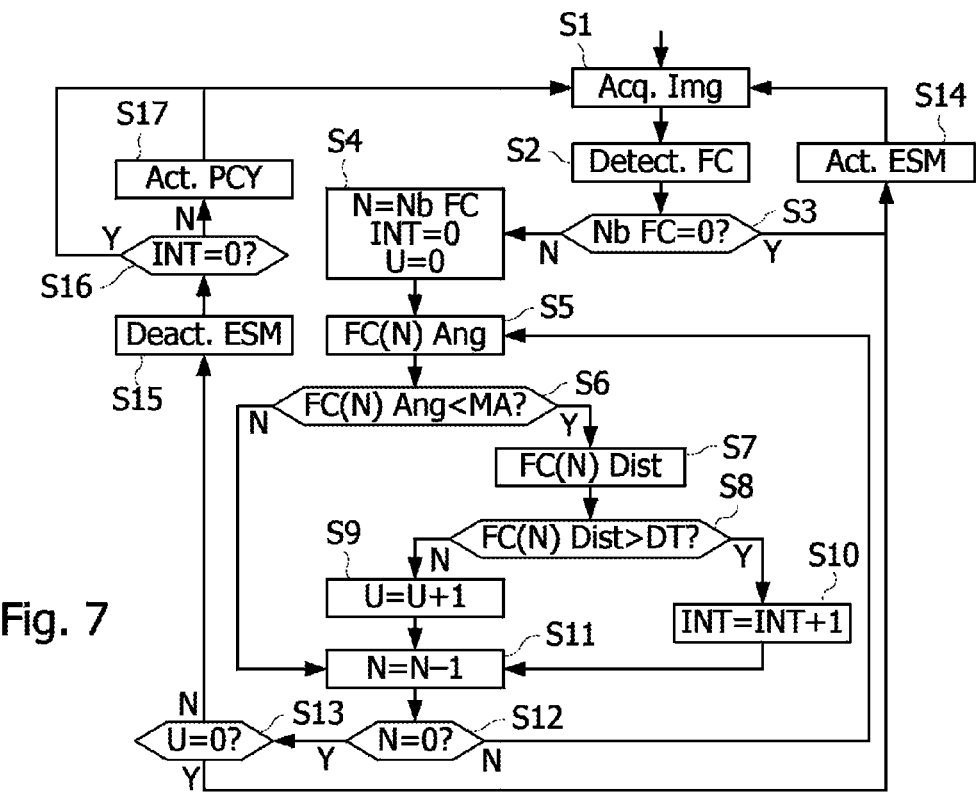
FIG. 7 represents a sequence of steps which can be executed by a protection device, according to one embodiment.

FIG. 7 represents an embodiment of a sequence of steps executed by the device PPD, for example by the unit PU. The sequence comprises steps S1 to S17 whereby a standby mode of the apparatus can be enabled if no face is detected at an angle smaller than the angle MA in relation to the camera axis direction of the image sensor and at a distance below the threshold DT. This sequence also enables a privacy protection function if at least two faces are detected at an angle smaller than the angle MA and at respective distances below and above the distance threshold DT. In step S1, the unit PU receives an image from the image sensor, for example in the memory FM. In step S2, the unit PU executes a face detection algorithm to detect faces in the image acquired in step S1. In step S3, the number of faces detected in the image is tested. If this number is zero, the unit PU executes step S14, then returns to step S1, or otherwise it executes steps S4 to S6. In step S14, the unit PU sends the apparatus a standby control signal or a signal indicating the absence of any user in front of the apparatus. The apparatus DV can thus take any appropriate measure or any measure adapted to its capacities to prevent confidential data from being visible on the screen DSP. For this purpose, the apparatus DV can for example be put into a standby mode in which at least the screen DSP is in standby mode or off, or even displays a screen saver. At the end of step S14, the unit PU controls the acquisition of a new image in step S1.

In step S4, the unit PU sets a parameter N to the number of faces detected, and counters INT and U to 0. In step S5, the unit PU calculates the distance in the image between one of the detected faces and the vertical median line ML of the image, this distance corresponding to an angle formed between the direction OZ and that of the detected face. In step S6, if the angle corresponding to this distance is greater than the maximum angle MA, indicating that the detected face is outside the intelligible viewing zone of the screen DSP, the unit PU executes steps S11 and S12. In the opposite case, the unit PU executes steps S7 and S8. In step S7, the unit PU proceeds with the estimation of the distance D1, D2 between the detected face and the image sensor. In step S8, the unit PU compares this distance with a threshold value DT. If this distance is below the threshold value DT, the unit PU considers the detected face to be that of a user and executes step S9 in which it increments by one the counter U for counting the number of users. If the estimated distance of the face D1, D2 is above the threshold value DT, the unit PU executes step S10 in which a counter for counting the number of potential intruders is incremented by one. After steps S6, S9 and S10, the unit PU executes step S11 in which the number N of detected faces still to be processed is decremented by one. Then, in step S12, the unit PU tests the number N and continues the execution of the sequence with step S5 if there are still detected faces to be processed, or with step S13 if all the detected faces have been processed during steps S5 to S10.

In step S13, the number of detected users U is tested. The unit PU continues the execution of the sequence with step S14, if this number is zero and with step S15 in the opposite case. In step S15, the unit PU sends the apparatus DV an enabling control signal or a signal indicating the presence of a user in front of the apparatus, so that if necessary, the apparatus DV can perform an operation that is the opposite of the one executed in step S14, i.e., leaving the standby mode or switching on the screen DSP. In step S16, the unit PU tests the number of potential intruders INT. The unit PU continues the execution of the sequence with step S1 if the number INT is zero, and with step S17, and then with step S1 in the opposite case. In step S17, the unit PU sends the apparatus DV an alert signal indicating the presence of potential intruders. The apparatus DV can thus take any appropriate protection measure or any protection measure adapted to its capacities, like sending a sound signal, displaying an alert message on the screen DSP, or enabling a privacy filter, etc.

It will be understood by those skilled in the art that various alternative embodiments and various applications of the present disclosure are possible. For example, the present disclosure may be applied to an apparatus other than one comprising a display screen or displaying confidential information. Thus, the confidential information to be protected may simply be introduced by the user for example by means of a keyboard. The apparatus to be protected may for example be a payment terminal or an automated cash dispenser. In this case, the device PPD may monitor a zone from which the keys of a keyboard can be observed and indicate the presence of a person other than the user in this zone. More generally, the present disclosure applies to the control of an apparatus, whether or not comprising a screen, as a function of the presence or absence of persons in the vicinity of the apparatus and/or according to the respective positions of the persons detected in the vicinity of the apparatus. Thus, the present disclosure may also apply to the control of an air-conditioning apparatus for a room, according to the number of persons and the respective positions of those persons in the room. The present disclosure can also apply to the automatic opening of a gate only if a human face is detected in front of the gate, or to control a toy according to the presence and possibly the position of each user of the toy. The present disclosure can also be used in devices for counting people, for example to count the number of persons who went into a specific section of a supermarket or who stopped in front of an advertising screen, and the time they spent there, or even to count the number of passengers in vehicles passing in front of the device.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

The systems, modules and data structures may also be transmitted as generated data signals (e.g., as part of a carrier wave) on a variety of computer-readable transmission mediums, including wireless-based and wired/cable-based mediums.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
acquiring, using a protection device, an image of an environment of an electronic apparatus;
detecting, using the protection device, the presence of one or more human faces in the image acquired;
estimating, using the protection device, a respective position of each face detected in relation to the apparatus; and
sending a signal to the apparatus to enable a function of the apparatus based on a number of faces detected in the image and the estimated position of each detected face, wherein the estimation of the position of each detected face comprises estimating a distance between the apparatus and the detected face based on a ratio between a threshold human face distance and a value of a corresponding distance in the detected face.

2. The method according to claim 1 wherein the estimation of the position of each face detected in an image comprises estimating an angle formed between a camera axis direction of the image acquired and a direction in which the detected face is located.

3. The method according to claim 1 wherein the estimating the distance between the apparatus and a face detected in the image comprises applying the following formula:

$$D = k \frac{oh}{ps \cdot mos}$$

in which:
D is the distance to be estimated,
oh is the threshold human face distance,
mos is the value of the corresponding distance in the detected face, measured in the image in number of pixels,
ps is the width of a pixel, and
k is a constant related to characteristics of the protection device.

4. The method according to claim 1, comprising determining whether each face detected in a field of view of the apparatus is that of a user of the apparatus or of a person authorized by the user, or that of a potential intruder, based on the estimated distance between the apparatus and the detected face.

5. The method according to claim 1, wherein the enabled function of the apparatus comprises at least one of the following operations:
going into a standby mode of the apparatus if no face is detected at a distance below a distance threshold, and at an angle in relation to a camera axis direction of the image acquired, below an angle threshold,
leaving the standby mode if a face is detected at a distance below the distance threshold, and at an angle in relation to the camera axis direction below the angle threshold, and
enabling a privacy protection function if at least two faces are detected at an angle in relation to the camera axis direction below the angle threshold, and at distances from the apparatus respectively below and above the distance threshold or spaced out by a distance difference threshold value.

6. The method according to claim 5 wherein the protection function comprises at least one of the following operations:
sending or displaying an alert signal;
displaying the face of a person detected as an intruder; and
enabling a privacy filter on a display screen of the apparatus.

7. The method according to claim 1, comprising determining an average brightness of the image acquired and of turning on a lighting device if the average brightness determined is below a threshold.

8. The method of claim 1 wherein the protection device comprises an image sensor coupled to a dedicated processing unit.

9. The method of claim 1 wherein the protection device comprises a monochromatic image sensor.

10. A method, comprising:
acquiring, using a protection device, an image of an environment of an electronic apparatus;
detecting, using the protection device, the presence of one or more human faces in the image acquired;
estimating, using the protection device, a respective position of each face detected in relation to the apparatus; and
sending a signal to the apparatus to enable a function of the apparatus based on a number of faces detected in the image and the estimated position of each detected face, wherein the estimation of the position of each detected face comprises estimating a distance between the apparatus and the detected face and the estimating the distance between the apparatus and a face detected in the image comprises at least one of triangulation using two images obtained from exposure stations of the protection device spaced out from one another, and applying the following formula:

$$D = k \frac{oh}{ps \cdot mos}$$

in which:
D is the distance to be estimated,
oh is a threshold distance chosen in a human face,
mos is the value of the distance chosen in the detected face, measured in the image in number of pixels,
ps is the width of a pixel, and
k is a constant related to characteristics of the protection device.

11. The method of claim 10 wherein estimating the distance comprises applying the formula using an image from a single image sensor.

12. A device, comprising:
an image sensor configured to acquire an image of an environment of an electronic apparatus; and
image processing circuitry configured to:
detect the presence of one or more human faces in the image acquired;
estimate a respective position of each face detected in relation to the apparatus; and
selectively initiate a function of the apparatus based on a number of faces detected in the image and the estimated position of each detected face, wherein the estimation of the respective position of each detected face comprises estimating a distance between the apparatus and the detected face based on a ratio between a threshold human face distance and a value of a corresponding distance in the detected face.

13. The device of claim 12 wherein the image processing circuitry is configured to estimate an angle formed between an axis direction of the image acquired and a direction in which a detected face is located.

14. The device of claimer 12 wherein the image processing circuitry is configured to estimate the distance between the apparatus and the face detected in the image by applying the following formula:

$$D = k \frac{oh}{ps \cdot mos}$$

in which:
D is the distance to be estimated,
oh is the threshold human face distance,
mos is the value of the corresponding distance in the detected face, measured in the image in number of pixels,
ps is the width of a pixel, and k is a constant related to characteristics of the protection device.

15. The device of claim 12, further comprising a second image sensor, wherein the image processing circuitry is configured to estimate the distance between the apparatus and the face using triangulation applied to images taken by the two image sensors of the device.

16. The device of claimer 12 wherein the image processing circuitry is configured to determine whether each face detected in a field of view of the apparatus is that of a user of the apparatus or of a person authorized by the user, or that of a potential intruder, based on the estimated distance between the apparatus and the detected face.

17. The device of claim 12 wherein the function of the apparatus comprises at least one of the following operations:
   going into a standby mode of the apparatus if no face is detected at a distance below a distance threshold, and at an angle in relation to a camera axis direction of the image acquired, below an angle threshold,
   leaving the standby mode if a face is detected at a distance below the distance threshold, and at an angle in relation to the camera axis direction below the angle threshold, and
   enabling a privacy protection function if at least two faces are detected at an angle in relation to the camera axis direction below the angle threshold, and at distances from the apparatus respectively below and above the distance threshold or spaced out by a distance difference threshold value.

18. The device of claim 17 wherein the protection function comprises at least one of the following operations:
   sending or displaying an alert signal;
   displaying the face of a person detected as an intruder; and
   enabling a privacy filter on a display screen of the apparatus.

19. The device of claim 12 wherein the device is a system on a chip comprising the image sensor and the image processing circuitry.

20. The device of claim 12 wherein the image sensor comprises a monochromatic image sensor.

21. The device according to claim 12 wherein the image sensor is associated with an objective having a shooting field ranging between 80° and 120°.

22. The device according to claim 11, comprising an interface circuit to link processing circuitry to a lighting device, the processing circuitry being configured to control the lighting device according to an average brightness of the images sent by the image sensor.

23. A system, comprising:
   a display;
   processing circuitry coupled to the display; and
   a protection device having:
      an image sensor configured to acquire an image of an environment of the display; and
      one or more processors configured to:
         detect the presence of one or more human faces in the image acquired;
         estimate a respective position of each face detected in relation to the display; and
         selectively send a signal to the processing circuitry based on a number of faces detected in the image and the estimated position of each detected face, wherein the estimation of the respective position of each detected face comprises estimating a distance between the apparatus and the detected face based on a ratio between a threshold human face distance and a value of a corresponding distance in the detected face.

24. The system of claim 23 wherein the protection device is configured to estimate an angle formed between an axis direction of the image acquired and a direction in which a detected face is located.

25. The system of claim 24 wherein the protection device is configured to determine whether each face detected in a field of view of the display is that of a user of the system or of a person authorized by the user, or that of a potential intruder, based on the estimated distance between the display and the detected face.

26. The system of claim 23, comprising a lighting device, wherein the protection device is configured to determine an average brightness of the image acquired and turn on the lighting device if the average brightness determined is below a threshold.

27. The system of claim 23 wherein the image sensor comprises a monochromatic image sensor.

28. The system of claim 23 wherein the protection device is configured to estimate the distance between the display and the face detected in the image by applying the following formula:

$$D = k \frac{oh}{ps \cdot mos}$$

in which:
   D is the distance to be estimated,
   oh is the threshold human face distance,
   mos is the value of the corresponding distance in the detected face, measured in the image in number of pixels,
   ps is the width of a pixel, and
   k is a constant related to characteristics of the protection device.

* * * * *